(No Model.)
C. PREVET.
HOSE COUPLING.
No. 590,590. Patented Sept. 28, 1897.
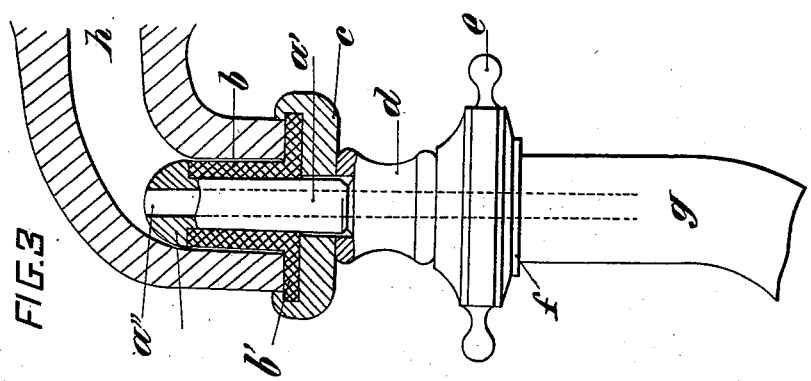
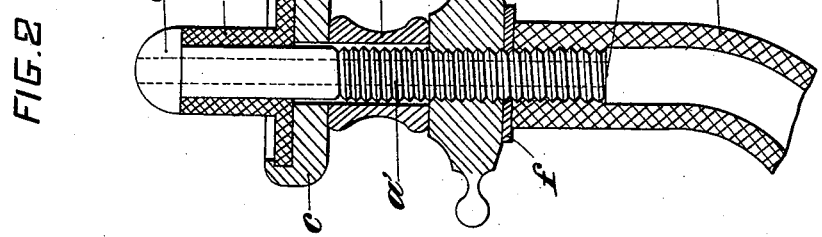
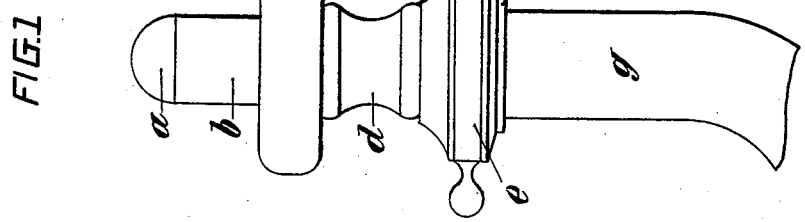
Witnesses:
Inventor
Charles Prevet,
By Briesen & Knauth
his Attorneys.

UNITED STATES PATENT OFFICE.

CHARLES PREVET, OF PARIS, FRANCE.

HOSE-COUPLING.

SPECIFICATION forming part of Letters Patent No. 590,590, dated September 28, 1897.

Application filed June 2, 1897. Serial No. 639,090. (No model.)

*To all whom it may concern:*

Be it known that I, CHARLES PREVET, of the city of Paris, France, have invented an Improved Hose-Coupling, of which the following is a full, clear, and exact description.

This invention relates to a hose-coupling for connecting one length of rubber hose to another or to a draw-off cock.

The invention is illustrated in the accompanying drawings, wherein—

Figure 1 is an external view, and Fig. 2 a longitudinal section, of the hose-coupling. Fig. 3 represents the coupling attached to a draw-off cock.

The same letters of reference denote like parts in all the figures.

The coupling comprises an expansible spigot formed of a screw-threaded tubular stem $a'$, provided with a head $a$ and garnished with a sleeve $b$, of rubber, provided with a flange $b'$, the sleeve being confined between the head $a$ and a cap $c$, recessed to receive the rubber flange $b'$, the cap being slipped on the stem and pressed toward the head $a$ by a nut $e$, screwing on the stem $a'$ and acting, through a distance-collar $d$, so as by the pressure to compress the tubular rubber sleeve $b$ longitudinally and expand it diametrically. The lower threaded end is screwed into the bore of the rubber hose $g$, which may be secured by a wire binding, if necessary, a washer $f$ being interposed between the nut $e$ and the hose $g$.

When the head $a$ and sleeve $b$ of the coupling are inserted into a socket on another length of tube or into the nozzle of a tap $h$, as in Fig. 3, the nut $e$ is screwed up, so as to expand sleeve $b$ within the socket or nozzle and also press the flange $b'$ against the end of the socket or nozzle, whereby a perfectly tight joint is insured and a thoroughfare for liquid is provided through the bore $a''$ of the stem $a'$.

I claim—

A hose-coupling consisting of an expansible spigot formed of a mushroom-headed tubular screw-threaded stem communicating with the hose attached thereto, a flanged india-rubber sleeve $b\ b'$ confined between the head $a$ and a cap $c$ loose on the stem and recessed to receive the flange $b'$ and a nut $e$ screwing on said stem and acting to compress the rubber sleeve longitudinally and expand it diametrically so as to cause it to fit tightly in the bore of the nozzle or socket of the cock or pipe to which it is to be connected and also compress its flange $b'$ against the end of the nozzle or socket substantially as specified.

The foregoing specification of my improved hose-coupling signed by me this 18th day of May, 1897.

CHARLES PREVET.

Witnesses:
 J. ALLISON BOWEN,
 MAURICE HENRI SIGNET.